(12) United States Patent
Carr

(10) Patent No.: US 6,495,074 B1
(45) Date of Patent: Dec. 17, 2002

(54) RESATURATION OF ASPHALT SHINGLES

(75) Inventor: Charles W. Carr, Edgewater, MD (US)

(73) Assignee: Clipper Roof Coatings, Inc., Glen Burnie, MD (US)

( * ) Notice: Subject to any disclaimer, the term of this patent is extended or adjusted under 35 U.S.C. 154(b) by 0 days.

(21) Appl. No.: 09/563,699

(22) Filed: May 2, 2000

(51) Int. Cl.⁷ .......................... B29C 73/02; C09K 3/10; C08L 91/00
(52) U.S. Cl. .................... 264/36.18; 264/343; 427/138; 427/140; 106/244; 106/246; 106/277; 516/29; 516/47; 516/198
(58) Field of Search ............................ 264/36.1, 36.18, 264/343; 427/138, 140; 106/277, 244, 246; 516/29, 47, 198

(56) References Cited

U.S. PATENT DOCUMENTS

| | | | | |
|---|---|---|---|---|
| 2,418,453 A | * | 4/1947 | Auer | 106/222 |
| 2,500,122 A | * | 3/1950 | Dixon et al. | 106/200.3 |
| 3,247,011 A | * | 4/1966 | Higgins | 106/283 |
| 4,236,951 A | * | 12/1980 | Krchma et al. | 106/285 |
| 4,392,270 A | | 7/1983 | Magee | 15/322 |
| 4,405,375 A | | 9/1983 | Gibson | 106/277 |
| 4,971,086 A | * | 11/1990 | Haug et al. | 106/244 |
| 5,236,497 A | | 8/1993 | Grzybowski | 106/282 |
| 5,599,586 A | | 2/1997 | Israel | 422/299 |
| 5,647,899 A | * | 7/1997 | Lightcap, Jr. | 106/244 |
| 6,309,456 B1 | * | 10/2001 | Anthony | 106/277 |

FOREIGN PATENT DOCUMENTS

EP 0607053 A1 * 7/1994 .............. C09K/3/10

* cited by examiner

Primary Examiner—Jan H. Silbaugh
Assistant Examiner—Michael I. Poe
(74) Attorney, Agent, or Firm—William S. Ramsey

(57) ABSTRACT

A method of maintaining as well as restoring the condition of weathered asphalt shingles and strips which are applied to flat roofs, pitched roofs, or vertical walls. The process involves applying resaturant neat or as a water emulsion. Suitable resaturants include fatty acid methyl esters, petroleum distillates, and water emulsions thereof. The process restores the suppleness and softness of the weathered shingles or strip and adds about three years to the lifetime of the roof. The process may be repeated for additional lifetime extension.

20 Claims, No Drawings

RESATURATION OF ASPHALT SHINGLES

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A "MICROFICHE APPENDIX"

Not Applicable.

BACKGROUND OF THE INVENTION

1. Field of the Invention

This invention pertains to a method for maintaining as well as restoring the flatness and flexibility to asphalt roofing shingles and strips of flat roofing.

2. Description of Related Art Including Information Disclosed Under 37 CFR 1.97 AND 1.98

This invention is a method of maintaining as well as restoring the flatness and flexibility to asphalt roofing materials, flat strips and shingles, which have become hardened, inflexible, and may be curled. Hardening, inflexibility, shrinking, and curling is a natural consequence of exposure to the atmosphere, weather and sun for an extended period. These effects result in breakage of the shingles, spontaneous cracking, and, subsequently, leakage and are generally taken as an indication that the roof must be replaced. Such degraded asphalt roofing materials will be termed "aged shingles" in this application.

Most asphalt is derived from the distillation of petroleum and is the residue which has a boiling point of greater than 600 degrees C. Asphalt is made primarily of hydrocarbons of various length along with molecules incorporating nitrogen, sulfur, and oxygen.

A number of chemical processes have been implicated in the reaction of asphalt with air, moisture, and sunlight including the following. Evaporation causes loss of volatile materials, in a process which is strongly impacted by temperature. Oxidation involves the reaction of oxygen with the chemical components of the asphalt and the reaction also is very temperature dependent. The result is incorporation of oxygen in the asphalt structure or the loss of a portion of that structure in the form of carbon dioxide or water. The asphalt therefore may lose or gain weight. Incorporation of oxygen into asphalt results in the oxidation of polar aromatic compounds resulting in compounds which are insoluble in paraffins and are termed asphaltenes. Asphaltenes have been implicated in the hardening of asphalts. Carbonization is the formation of free or elemental carbon from the asphalt and is accompanied by the loss of hydrogen from the asphalt molecules. Oxidation and carbonization both are highly stimulated by sunlight. Polymerization is due to condensation and polymerization of the component long chain molecules of asphalt. It takes place rapidly in newly poured asphalt and thereafter takes place predominantly on the surface of an asphalt shingle. Asphalt absorbs moisture to a certain degree, and when this happens, water soluble components of the asphalt are leached out. Water induced leaching is especially noticeable in asphalt which has been significantly oxidized.

U.S. Pat. No. 4,392,270 discloses an apparatus for cleaning build-up roofs by removing residual dust and fines. Such dust is stated to absorb hot resaturant material applied to the roof, thereby preventing the saturation of the roof mat by applied resaturant. The apparatus uses a combination of high and low pressure washing and a vacuum chamber to remove disrupted fines before the fines resettle.

U.S. Pat. No. 4,405,375 discloses a resaturant for flat built-up roofs in the form of a oil phase emulsion in a water phase. The oil phase consists of a blend of bitumen and aromatic hydrocarbons. A built-up roof is constructed of one or more layers of tar- or asphalt-impregnated felt. A sealant layer of tar or asphalt covers the felt and gravel is spread on the top to provide abrasion resistance. As the built-up roof ages, the sealant layer becomes eroded, checked, and cracked. In addition, the felt layers lose their flexibility and become torn. These processes result in leakage of water through the roof. The resaturant restores the waterproof qualities and furthermore restores the suppleness of the felt layers, thereby extending the lifetime of the built-up roof.

U.S. Pat. No. 5,236,497 discloses a cold patch composition for pavement repair which is uses recycled asphalt roofing wastes as a source of asphalt, filler, and fiber. The asphalt roof wastes are ground to provide a desirable particle size distribution, aggregate (crushed stone) is added, along with solvent (petroleum distillate solvents, including fuel oil, kerosene, mineral spirits, flux oils and the like) and anti-strip agents, which affect the water/moisture stability in the asphalt in some way. The resulting cold patch has properties of work ability and green-strength unexpected for a cold patch containing so large a proportion of recycled asphalt.

U.S. Pat. No. 5,599,586 discloses a maintenance system for residential roofing materials which includes film forming emulsion polymers and water soluble polyvalent metallic salts. A film is formed on the surface of the roofing material which has the properties of enhancing the appearance of the roof by suppressing the growth of algae. The polymers act to retain the preferred polyvalent metallic salts of copper, tin and zinc and thereby sustain their antimicrobial effect.

None of the prior art disclosures achieve the results of the present invention, that of maintaining as well as restoring to a flattened and supple form roofing shingles which have dried-out, become hard, and curled up. A typical asphalt shingle roof has a lifetime of about 20 years. A new roof may be applied over the old shingles, but accepted practice requires that old shingles be removed before a third roof is applied, at a removal cost approximating the cost of applying a new roof. A single use of the resaturant of the present invention extends the life of a 20-year roof by about three years or 15%. The treatment may be repeated for at least one additional extension of roof life. Thus the present invention provides substantial economic advantage to the user by deferring the costs of removal of the old roof and installation of the new roof.

BRIEF SUMMARY OF THE INVENTION.

This invention is a method of maintaining as well as restoring asphalt roofing shingles and strips which have become hardened, inflexible and curled through the process of weathering, termed "aged shingles" in this disclosure. The term "roo" will be used to mean asphalt shingles and strips applied to both flat and peaked roofs or to vertical walls. The term "resaturant" will be used to include liquids whose use in maintaining and restoring aged shingles is disclosed in this application. Other terms may be used to describe resaturants, such as rejuvenator, renewer, reinvigorator, preserver, preservative, sealer and sealant.

The invention involves applying a resaturant to a roof which needs treatment. Suitable resaturants include fatty acid methyl esters, methyl esters of soybean oil, and petroleum distillates, and water emulsions of these resaturants, and mixtures of these resaturants, and water emulsions of mixtures of these resaturants.

An objective of this invention is to extend the lifetime of asphalt shingle and strip roofs.

Another objective is to cause hardened and curled asphalt shingles to become supple and to flatten.

Another objective is to provide a nonflammable method of treating asphalt shingles with resaturant.

Another objective is to provide a resaturant emulsion which allows convenient limitation of the amount of resaturant applied in a single application of the emulsion.

Another objective is to provide a method of treatment of weathered asphalt shingles and strips which allows spraying of the treatment solution.

Another objective is to provide a method of treatment of asphalt shingles and strips which can be brushed onto the surface being treated.

Another objective is to provide a method of treatment of asphalt shingles and strips which can be rolled onto the surface being treated.

Another objective is to provide a resaturant which has minimal rates of evaporation from the asphalt shingles or strips after treatment.

Another objective is to provide a resaturant which can be readily absorbed by the asphalt shingles or strips.

Another objective is to provide a non-toxic resaturant for use in treating weathered asphalt shingles and strips.

Another objective is to provide a water clear resaturant solution which avoids or minimizes affects on the color, gloss, or other aesthetic characteristics of asphalt shingles or strips.

Another objective is to provide a method for restoring weathered asphalt shingles and strips which is equally applicable to flat roofs, sloped roofs, and vertical shingled walls.

A final objective is to provide a method of restoring weathered asphalt shingles and strips which is inexpensive, easily applied in a safe manner, and without adverse effect on the environment.

BRIEF DESCRIPTION OF THE SEVERAL VIEWS OF THE DRAWING(S)

Not Applicable.

DETAILED DESCRIPTION OF THE INVENTION

Although the solutions of this invention are termed "resaturant" this term is descriptive only and does not necessary aid in understanding the mode of action of these solutions. The inventor surprisingly has discovered three types of resaturant; fatty acid methyl esters; and solvents for asphalts petroleum distillates. Each type of resaturant may be applied as a water emulsion. Each resaturant is clear in appearance, or opalescent in the case of emulsions, and avoids or minimizes effects on the color, gloss, or other aesthetic characteristics of the roof.

Although the above resaturant solutions may or may not act as solvents for asphalt, the applicant has surprisingly found that any asphalt solvent, mixtures of any asphalt solvent, water emulsions of any asphalt solvent, and water emulsions of mixtures of any asphalt solvent are resaturants as the term is used in this application.

Without wishing to be held to this explanation, applicants believe it is possible that the mode of action for resaturants in restoring the suppleness and softness to aged shingles is through the temporary dissolution of asphalt components which allows the absorption of volatile components from the resaturants into the asphalt. S resaturant-sourced volatiles replace the volatile components in the asphalt which have been lost during aging. According to this explanation, the restored shingles are subject to continuing loss of volatile components with further loss of suppleness and acquisition of hardness, which can be re-restored at a future time by re-application of resaturant.

Other explanation are possible. It is possible that resaturants act predominately on asphaltenes, which have been associated with asphalt aging, and may served to enhance the dissolution of such compounds in the asphalt thereby removing the hardening effects of aging.

Resaturants

Fatty Acid Methyl Esters

A wide variety of fatty acid methyl esters may be incorporated into the compositions of this invention. A wide varieties of vegetable oils are suitable sources for these compounds, for example, corn, palm, cottonseed, flax, castor, and soybean oils. A preferred source is the esters obtained by the transesterification of soybean oil, also known as methyl esters of soybean oil, or as alkyl $C_{16}$-$C_{18}$ methyl esters. These compounds have a boiling point of greater than 400 degrees F. and a flash point of 425 degrees F. They are relatively non-toxic and biodegradable. These esters are used primarily as a substitute for petroleum based cleaning solvents such as naphtha and mineral spirits. In the examples given below, the fatty acid methyl esters were the SOYGOLD 1000 brand fatty acid methyl esters obtainable from Ag Environmental Products L. L. C., Lenexa, Kans.

Fatty acid methyl esters are the main product of transesterification of oils with excessive amounts of methyl alcohol in the presence of acid or alkaline catalyst. The reaction, also termed alcoholysis, converts triglycerides to a complex mixture predominantly methyl esters of fatty acids but containing trace amounts of triglyceride, diglycerides, monoglycerides and glycerol.

Petroleum Distillates.

Petroleum distillates, sometimes called hydrocarbons or petrochemicals, consist primarily of hydrocarbon molecules with eight to sixteen carbon atoms. They are produced primarily through the straight-run distillation of crude oil. Depending on the composition of the raw crude and other petroleum stock used for production, petroleum distillates typically undergo further processing to reduce the sulfur and acid content either by chemical treatment or by more severe processing. More severe processing methods include hydro treating and hydro cracking. These processes can remove heteroatoms, enhance fuel hydrogen content, and change distillation characteristics.

The term "petroleum distillates" covers a very wide range of compounds, all of which are effective as resaturants. A useful way to characterize petroleum distillates is through their boiling ranges. Examples of useful petroleum distillates and their boiling ranges, in ° C., follow: light naphtha, -1–150; gasoline, -1–180; heavy naphtha, 150–205; kerosene, 205–260; stove oil, 205–290; light gas oil, 260–315; heavy gas oil, 315–425.

Another way of describing petroleum distillates is in terms of molecular structure. All contain greater or lesser amounts of aromatic, naphthenic or aliphatic, and paraffinic hydrocarbons.

Several examples of petroleum distillates are effective as resaturants as follows:

Mineral Spirits

Mineral spirits is a petroleum distillate with a boiling range of 110–150° C. It is a wide cut, slow evaporating, mainly aliphatic in composition. It finds wide use as a solvent, in cleaning, and as a diluent for enamel and other paints.

Kerosene

Kerosene is a petroleum distillate with a boiling range of 205–260° C. The flash point of kerosene is about 50° C. Kerosene is a complex mixture of $C_9$–$C_{16}$ hydrocarbons with an average molecular weight about 170.

Diesel fuel

Diesel fuel is a middle distillate of petroleum having a boiling point in the range of 180–370° C. The flash point of dies hydrocarbons.

The above fatty acid methyl esters and petroleum distillates are effective as resaturants, either neat, as mixtures, or as water emulsions. The choice of resaturant will depend on various factors, such as the expected ambient temperature of application, the availability and cost of individual resaturants, and the presence or absence of an objectionable odor.

Application.

The resaturants of the present invention are liquids and may be applied by any convenient method, such as spraying, rolling, mopping, or brushing. These resaturants are especially appropriate for do it yourself application by a homeowner because the application is simple and relatively non-toxic materials are involved. Spraying is a preferred methods because of its convenience and because it does not involve contact with the aged shingles with a brush and minimizes the need to walk on the roof surface. Any suitable sprayer may be used, for example, a Wagner power sprayer.

The methods of application apply equally to both neat resaturants, mixtures of resaturants, water emulsions of resaturants, and water emulsions of mixtures of resaturants, all of which are termed "resaturant solutions". Resaturant solutions are clear or translucent and have no effect on the color of the shingles to which they are applied. Resaturant solution are applied until the shingle surface is well wetted. The shingles are then left to dry and visible effects resulting in flattening of curled shingles and restoration of suppleness to hardened shingles are visible within three weeks.

Care must be taken while applying the resaturant solution to avoid damage to the weathered roof through excessive walking on the shingles or through excessive brushing or rolling with a broom or other brush or a roll. For this reason, it is preferred to spray the resaturant solution onto the roof. Resaturant solutions may be applied by any suitable hand sprayer, such as a yard and lawn spray er commonly used for application of pesticides. A power washer also may be used to spray the resaturants. A TERMINATOR power washer, manufactured by Williamson Welding Supply, Worthington, Minn., is a preferred sprayer for this purpose. Sprayers are used to spray resaturants neat or as emulsions.

Resaturant solutions, neat or emulsion, are applied by brushing or rolling in the manner of is especially useful in applying the resaturant solutions without excessive walking on the shingles applying paint to a flat surface. A 16" wide Street Broom with soft bristles and a handle of 12'–14' or excessive brushing or rolling of the shingles.

Although the resaturants can be applied neat, as fatty acid methyl esters, petroleum distillates or mineral spirits, there are some advantages in applying them as water based emulsions. Application of an emulsion has the advantage of allowing thorough wetting of the surface without the wasteful application of excess resaturant. This simplifies the application. Furthermore, although fatty acid methyl esters are relatively non-flammable with a flash point of greater than 300 degrees Fahrenheit, petroleum distillates and mineral spirits are relatively flammable with flash points of approximately 100–165 degrees Fahrenheit and 110–190 degrees Fahrenheit, respectively. Application of petroleum distillates and mineral spirits resaturants as emulsions, while not eliminating the possibility of contributing to a fire, do serve to reduce the fire hazard.

Emulsions

An emulsion is a mixture of two or more liquids in which one is present as droplets distributed throughout the other. In the present invention, resaturant solutions are prepared as emulsions by dispersing the organic resaturants into water. Emulsion formation is made possible by the addition of emulsifiers. A wide variety of emulsifiers are available, for example, alkanolamides, amido-amines, emulsifying waxes, phosphate esters, polyoxyethylene esters, polyethylene sorbitan esters, polyoxyethylenes, polyoxypropylenes and polyoxytheylene ethers, and sorbitan esters. Suitable formulations are very dependent on the ingredients of the emulsions. Suitable emulsions are formulated as follows, in percentage by weight: water, 40–70; emulsifier, 10–30;fatty acid methyl esters or petroleum distillates, 20–40. Water emulsions of methyl esters of fatty acids and petroleum distillates are formulated as follows:

TABLE 1

Water emulsion of methyl esters of fatty acids

| Emulsion Component | Weight Percent |
|---|---|
| Water | 50 |
| Methyl Ethyl of Soybean Oil SOYGOLD 1000. obtained from Agricultural Environmental Products, Lenexa, Kansas | 21 |
| Sodium mixed C8 Amphocarboxylate MIRANOL JEM obtained from Rhone-Poulenc, | |
| Lauryl N,N-bis (hydroxyethyl) Amide VARAMIDE MA-1 obtained from CK Witco Corporation, Greenwich, Connecticut | 7 |
| Nonyphenol Polyethylene Glycol Ether TERGITOL-9 obtained from Union Carbide, Danbury, Connecticut. | 7 |
| Nonyphenol Polyethylene Glycol Ether TERGITOL-6 obtained from Union Carbide, Danbury, Connecticut. | 5 |

TABLE 2

Water Emulsion of Diesel Fuel

| Emulsion Component. | Weight Percent |
|---|---|
| Water | 40 |
| Diesel Fuel | 40 |
| Lauryl N,N-bis (hydroxyethyl) Amide | 20 |

TABLE 3

Water Emulsion of Mineral Spirits

| | Weight Percent |
|---|---|
| Water | 30 |
| Mineral spirits | 50 |
| Sodium mixed C8 Amphocarboxylate | 20 |

EXAMPLE 1

A wooden test roof structure was constructed at grade in a parking lot in Maryland. Asphalt roof shingles for the test were obtained from the demolition debris from a residential roof renewal project. Asphalt roof shingles were selected for use in the pilot test, to include only those which had weathered to a brittle condition with typical accompanied deformation. The asphalt roof shingles were three tab shingles approximately 20 years old and white in color. Methyl ester of soybean oil manufactured by Agricultural Environmental Products was applied neat to the asphalt roof shingles using a hand held quart size manual trigger style spray bottle. Methyl ester of soybean oil was applied until the surface was saturated. The pilot test was carried out over a three week period. As the methyl ester of soybean oil was absorbed into the asphalt roof shingle material the oily appearance on the surface of the asphalt roof shingle became less apparent and the asphalt roof shingle became increasingly less brittle. After three weeks the asphalt roof shingles became pliable enough to return to the flat geometry they had when originally installed. During the three week pilot test the prevailing weather conditions were dry and 85 to 95 degrees F.

EXAMPLE 2

An institutional building was the subject a pilot test. The asphalt roof shingles had previously failed. The shingles had weathered to a brittle condition with typical accompanied deformation. The asphalt roof shingles were three tab shingles approximately 10 years old and brown in color. Methyl ester of soybean oil manufactured by Agricultural Environmental Products was applied neat to the asphalt roof shingles using a hand held quart size manual trigger style spray bottle. Methyl ester of soybean oil was applied until the surface was saturated. The pilot test was carried out over a one year period. As the methyl ester of soybean oil was absorbed into the shingle material the oily appearance on the surface of the asphalt roof shingle became less apparent and the shingle became increasingly less brittle. In three weeks the asphalt roof shingles became pliable enough to return to the flat geometry they had when originally installed. The brown asphalt roof shingles did not show an oily surface appearance at any time during the observation period.

EXAMPLE 3

An institutional building was the subject a pilot test. The asphalt roof shingles had previously failed. The shingles had weathered to a brittle condition with typical accompanied deformation. The asphalt roof shingles were three tab shingles approximately 20 years old and white in color. Methyl ester of soybean oil manufactured by Agricultural Environmental Products was emulsified in water and applied to the asphalt roof shingles using a hand held quart size manual trigger style spray bottle. The methyl ester of soybean oil emulsion was applied until the surface was saturated. The pilot test was carried out over a six month period. As the methyl ester of soybean oil emulsion dried the wet appearance gradually changed to an oily appearance. As the remaining methyl ester of soybean oil was absorbed into the asphalt roof shingle material the oily appearance on the surface of the asphalt roof shingle became less apparent and the shingle became increasingly less brittle. In three weeks the asphalt roof shingles became pliable enough to return to the flat geometry they had when originally installed. The white asphalt roof shingles did not show an oily surface appearance after four weeks. The formulation of TABLE 1 was used for the emulsion.

EXAMPLE 4

A water emulsion of the petroleum distillate diesel fuel of TABLE 2 is applied by brushing to a garage with a shingled roof approximately 23 years old. The shingles are saturated with the emulsion and allowed to dry. A flattening of the weathered and curled shingles is observed within 3 weeks of application. The shingles are black and no alteration in color is observed.

EXAMPLE 5

A flat roof covered with strips of weathered asphalt approximately 25 years old is treated by brushing with a water emulsion of mineral spirits of TABLE 3. The surface of the roof is saturated with the emulsion which is then spread using a street broom with a long handle. The resaturant is applied in September on a clear day and all traces of wetness are gone within 24 hours. The weathered strips are restored to flatness in about two weeks.

EXAMPLE 6

The resaturant solution kerosene is applied neat to a vertical wall which is surfaced with weathered asphalt shingles which are 16 years old. A paint brush is used to apply the resaturant. The surface becomes dry after approximately 6 hours. The weathered asphalt shingles are flattened and are restored to suppleness.

It will be apparent to those skilled in the art that the examples and embodiments described herein are by way of illustration and not of limitation, and that other examples may be utilized without departing from the spirit and scope of the present invention, as set forth in the appended claims.

I claim:

1. The method of restoring or maintaining asphalt shingles in need of such treatment comprising the step of:

applying a clear or opalescent resaturant solution comprising fatty acid methyl esters to asphalt shingles thereby restoring softness and flexibility to the asphalt shingles.

2. The method of claim 1 wherein the resaturant solution is selected from the group consisting of fatty acid methyl esters, a mixture of fatty acid methyl esters, a water emulsion of fatty acid methyl esters, and a water emulsion of a mixture of fatty acid methyl esters.

3. The method of claim 1 wherein the resaturant solution in percent by weight is comprised of:

water, 40 to 70;

emulsifer, 10 to 30; and

4. The method of claim 1 wherein the resaturant solution in percent by weight is comprised of:

water, 40 to 60;

alkanolamides, 4 to 10;

emulsifying agents, 6 to 18;

synthetic surface active agents 5 to 15; and fatty acid methyl esters, 11 to 31.

5. The method of claim 1 wherein the resaturant solution is nonflammable.

6. The method of claim 1 wherein the resaturant solution is applied by spraying.

7. The method of claim 1 wherein the resaturant solution is applied by brushing.

8. The method of claim 1 wherein the resaturant solution is applied by rolling.

9. The method of claim 1 wherein the restoration of asphalt shingles comprises flattening of the shingles.

10. The method of claim 1 wherein the asphalt shingles are mounted on a non-horizontal surface.

11. The method of claim 1 wherein the asphalt shingles are mounted on a sloped roof.

12. The method of claim 1 wherein the asphalt shingles are mounted on a vertical wall.

13. The method of claim 1 wherein the asphalt shingles in need of restoration are curled, shrunken, cracked, or hardened.

14. The method of restoring or maintaining asphalt shingles in need of such treatment comprising the step of:
   applying a resaturant solution to asphalt shingles thereby restoring softness and flexibility to the asphalt shingles wherein the resaturant solution is selected from the group consisting of fatty acid methyl esters, methyl esters of soybean oil, mixtures of fatty acid methyl esters and methyl esters of soybean oil, a water emulsion of fatty acid methyl esters a water emulsion of mixture fatty acid and methyl esters of soybean oil.

15. The method of claim 14, wherein the resaturant solution is fatty acid methyl esters or a water emulsion thereof.

16. The method of claim 15, wherein the fatty acid methyl esters are alkyl $C_{16}$–$C_{18}$-methyl esters.

17. The method of claim 15, wherein the fatty acid methyl esters are derived from vegetable oil.

18. The method of claim 17, wherein the vegetable oil is soybean oil.

19. The process of restoring or maintaining the suppleness and softness of asphalt shingles without affecting the color, gloss or other aesthetic characteristics of the shingles comprising the steps of:
   a. coating the surface of the asphalt shingles with a clear or opalescent resaturant solution, and
   b. absorbing volatile components from the resaturant solution into the asphalt shingles by temporarily.
   dissolving asphalt components of the asphalt shingles whereby the volatile components from the resaturant solution replace the volatile components in the asphalt shingles which have been lost to thereby restore the suppleness and softness of the asphalt shingles.

20. The process of claim 19, wherein the restored asphalt shingles are re-restored at a future time by the re-application of the resaturant solution upon further loss of suppleness and acquisition of hardness.

* * * * *